(12) United States Patent
Huang et al.

(10) Patent No.: US 8,324,960 B2
(45) Date of Patent: Dec. 4, 2012

(54) CHARGE PUMP DOUBLER

(75) Inventors: Ming-Chieh Huang, San Jose, CA (US);
Chan-Hong Chern, Palo Alto, CA (US);
Chih-Chang Lin, San Jose, CA (US);
Tien-Chun Yang, San Jose, CA (US);
Yuwen Swei, Fremont, CA (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 149 days.

(21) Appl. No.: 12/849,503

(22) Filed: Aug. 3, 2010

(65) Prior Publication Data

US 2012/0032731 A1  Feb. 9, 2012

(51) Int. Cl.
*G05F 1/10* (2006.01)
*G05F 3/02* (2006.01)

(52) U.S. Cl. ........................................ 327/536
(58) Field of Classification Search .......... 327/536; 363/59–60

See application file for complete search history.

(56) References Cited

U.S. PATENT DOCUMENTS

| | | | | |
|---|---|---|---|---|
| 6,166,585 | A * | 12/2000 | Bazzani | 327/536 |
| 6,356,137 | B1 * | 3/2002 | Roohparvar et al. | 327/390 |
| 7,592,858 | B1 | 9/2009 | Jung | |
| 2002/0075064 | A1 * | 6/2002 | Fujii et al. | 327/536 |
| 2002/0101744 | A1 * | 8/2002 | DeMone | 363/59 |

* cited by examiner

*Primary Examiner* — Quan Tra
(74) *Attorney, Agent, or Firm* — Lowe Hauptman Ham & Berner, LLP

(57) ABSTRACT

An integrated circuit includes a first PMOS transistor, where its drain is arranged to be coupled to a voltage output, and its source is coupled to the drain of a second PMOS transistor. The source of the second PMOS transistor is arranged to be coupled to a high power supply voltage. The source and drain of a MOS capacitor are coupled to the source of the first PMOS transistor. The drain of an NMOS transistor is coupled to the drain of the first PMOS transistor. The integrated circuit is configured to receive a voltage input to generate the voltage output having a maximum voltage higher than the voltage input. The gate oxide layer thickness of the MOS capacitor is less than that of the first PMOS transistor.

20 Claims, 4 Drawing Sheets

US 8,324,960 B2

CHARGE PUMP DOUBLER

TECHNICAL FIELD

The present disclosure relates generally to an integrated circuit, and more particularly, a charge pump doubler.

BACKGROUND

For conventional charge pump circuits, the pump driving capability can degrade due to low power supply voltage (VDD), low temperature, or high threshold voltage (Vt) of Metal-Oxide-Semiconductor (MOS) transistors with thick gate oxide. More specifically, these factors can adversely affect a charge pump doubler circuit in the charge pump from doubling its input voltage range for its output. If the charge pump doubler is unable to generate voltage output high enough, e.g., close to two times of the input voltage such as VDD in some applications, it can suffer from low efficiency, e.g., from current flowing back to drop the output voltage. Therefore, new circuits and methods are desired to solve the above problems.

BRIEF DESCRIPTION OF THE DRAWINGS

Reference is now made to the following descriptions taken in conjunction with the accompanying drawings, in which.

DETAILED DESCRIPTION

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

Figure 1:
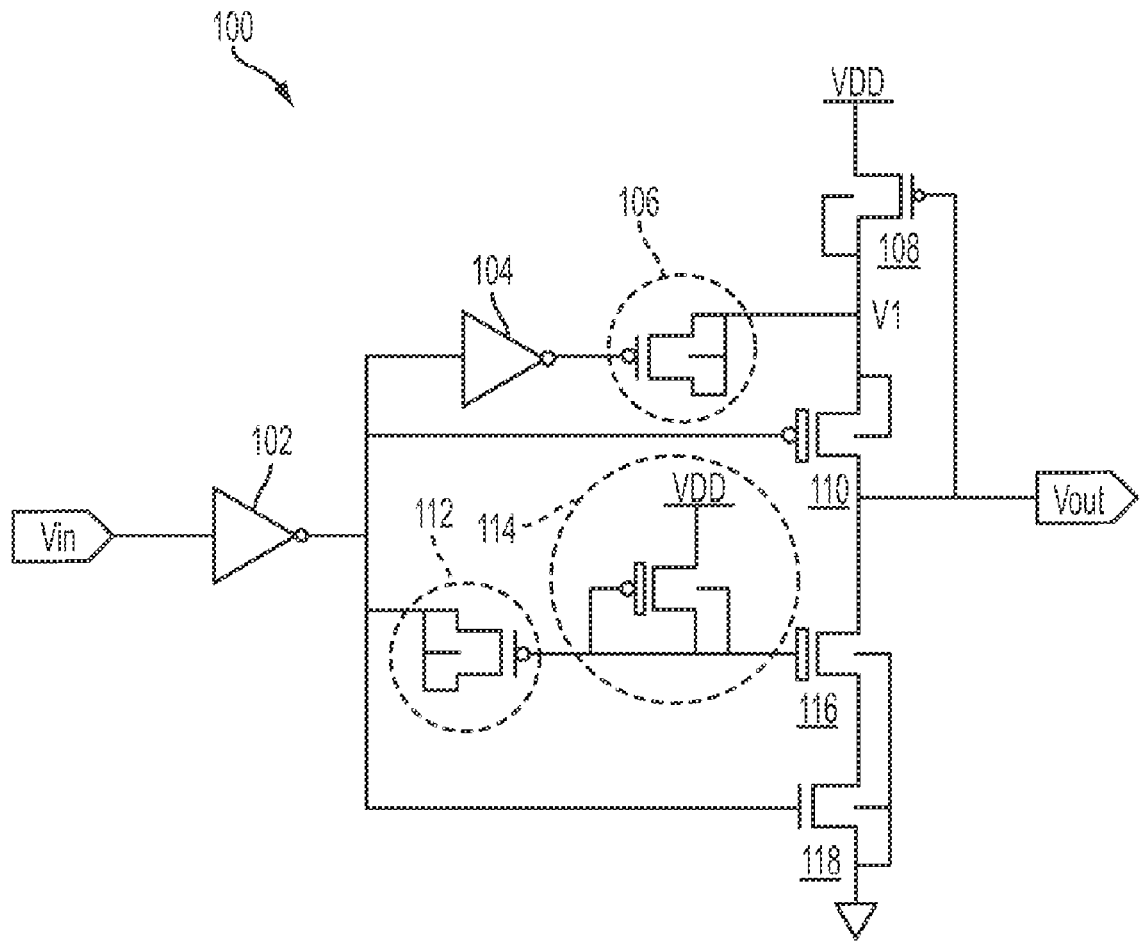
FIG. 1 is a schematic diagram showing an exemplary charge pump doubler circuit according to one embodiment.

FIG. 1 is a schematic diagram showing an exemplary charge pump doubler circuit according to one embodiment. A charge pump doubler circuit 100 supplies a broader range of output voltage with a higher maximum voltage at its output than the input voltage it receives at its input, used at various stages of a charge pump (not shown). For example, a voltage output (Vout) can have a broader voltage range of 0 V-1.8 V than a voltage input (Vin) of 0 V-0.9 V, using a power supply voltage VDD=0.9 V. Due to the higher maximum voltage at Vout, devices of the charge pump doubler circuit 100 that are subject to high stress may have greater gate oxide thickness than other devices used elsewhere, e.g., logic devices (also referred to as core devices).

In the circuit 100, in some embodiments, an inverter 102 is electrically coupled to Vin and used for Vin and Vout to have the same logic state, e.g., when Vin is a logical 1, Vout is also a logical 1. When Vin is a logical 0, a logical 1 from the inverter 102 is applied to a PMOS transistor 110 that has a thick gate oxide. The PMOS transistor 110 with a thick gate oxide is turned off. Also, the logical 1 from the inverter 102 is applied to turn on an NMOS transistor 116 (that has a thick gate oxide) through a MOS capacitor 112 and a diode-connected PMOS transistor 114 (i.e., its gate and drain are connected), and to turn on another NMOS transistor 118 with gate oxide thinner than the NMOS transistor 116. Therefore, Vout is pulled down to a logical 0. Another inverter 104 outputs a logical 0 at the gate of another MOS capacitor 106 and the MOS capacitor 106 is charged up to VDD since the Vout at a logical 0 turns on a PMOS transistor 108. The PMOS transistor 108 does not need to have a thicker gate oxide than a logical device, because the voltage difference across the PMOS transistor 108 is not greater than VDD. Also, the voltage difference across the MOS capacitor 106 is not greater than VDD, and it does not require a thicker gate oxide than a logic device.

In some embodiments, the MOS capacitor 112 is charged to have a voltage difference VDD−Vt between the gate and the source/drain of the MOS capacitor 112. The diode-connected PMOS transistor 114 together with the MOS capacitor 112 allows the NMOS transistor 116 with a thick gate oxide to be turned on by keeping the gate voltage of the NMOS transistor 116 at a voltage higher than VDD, e.g., 2×VDD−Vt when Vin is logic 0, where Vt is the threshold voltage of the diode-connected PMOS transistor 114. The diode-connected PMOS transistor 114 can have a thicker gate oxide than or a gate oxide with thickness similar to a logic device. The MOS capacitor 112 can have a gate oxide with thickness similar to a logic device.

When Vin is a logical 1, a logical 0 from the inverter 102 is applied to the PMOS transistor 110 to turn it on. Also, the logical 0 from the inverter 102 is applied to turn off the NMOS transistor 116 through the MOS capacitor 112 and the diode-connected PMOS transistor 114 (the gate voltage of the NMOS transistor 116 is (VDD−Vt), where Vt is the threshold voltage of the diode-connected PMOS transistor 114), and to turn off the NMOS transistor 118. Another inverter 104 outputs a logical 1 (which has a voltage level of VDD) at the gate of another MOS capacitor 106, and because the MOS capacitor 106 retains the charged up voltage, Vout becomes a logical 1 higher than VDD, close to two times VDD. Therefore, the circuit 100 has a higher voltage range of Vout at logic 1 than that of Vin. The PMOS transistor 108 is turned off by the Vout at logical 1.

The circuit 100 selectively use devices with thicker gate oxide, e.g., the PMOS transistor 110 and NMOS transistor 116, to endure high voltages from Vout, and devices having its gate oxide thickness similar to logic devices when thicker gate oxide is not needed, e.g., the PMOS transistor 108 and NMOS transistor 118, and the MOS capacitor 106 and 112, in order to avoid increased threshold voltages in these transistors.

Figure 2:
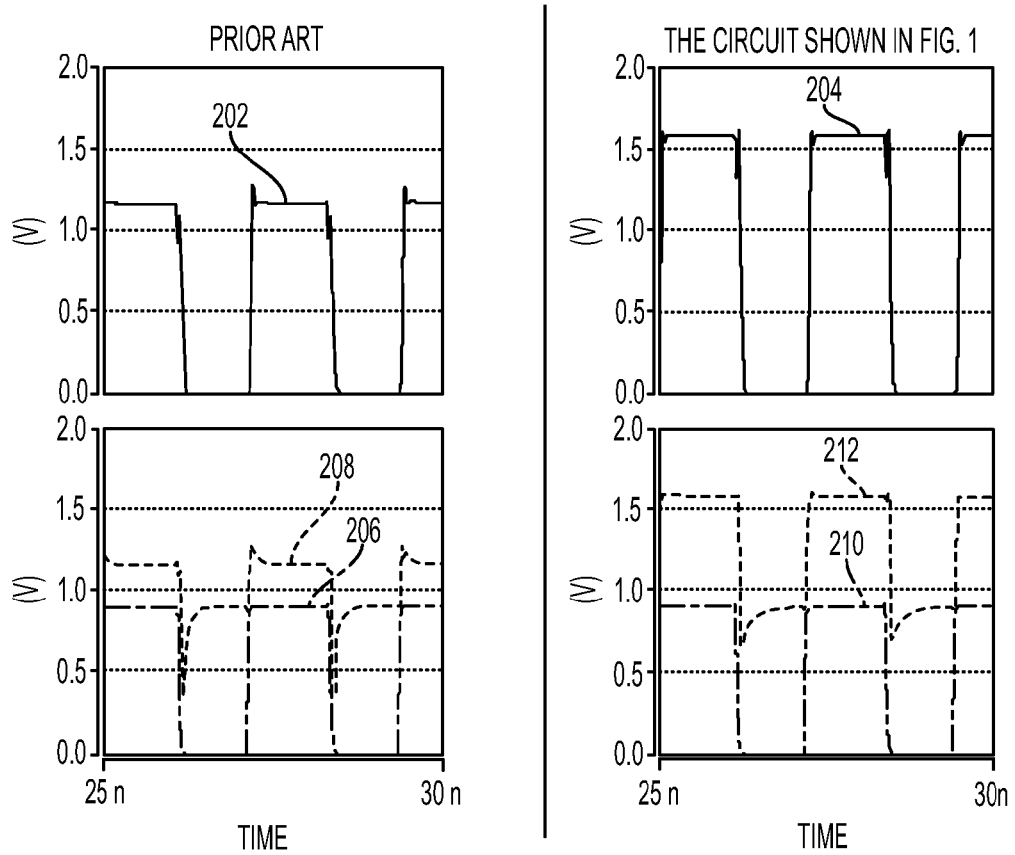
FIG. 2 is a plot showing waveforms of an exemplary conventional circuit and the charge pump doubler circuit shown in FIG. 1 according to one embodiment.

FIG. 2 is a plot showing waveforms of an exemplary conventional circuit and the charge pump doubler circuit shown in FIG. 1 according to one embodiment. An exemplary conventional circuit has Vout 202 that is about 1.2 V at a logical 1, only 0.3 V above Vin 206 at about 0.9V (VDD). In comparison, an exemplary circuit of FIG. 1 has Vout 204 that is about 1.6 V, 0.7 V above Vin 210 at about 0.9V. The performance difference can be also shown by the voltage at node V1 (shown in FIG. 1) or its counterpart in a conventional circuit, e.g., 208 and 212.

The Vout improvement is also reflected in the current driving capability of a charge pump using the charge pump doubler circuit 100. In one example, an exemplary charge pump circuit using three charge pump doubler circuits 100 in each of its four charge pump sets, the current driving capability was 5.59 mA, compared to only 2.48 mA of a conventional circuit (using typical speed devices (TT), at a temperature at −40 degrees C., VDD=0.85 V, assuming a PMOS transistor with a thicker gate oxide has a Vt that is 200 mV higher than a logic device.)

Figure 3:
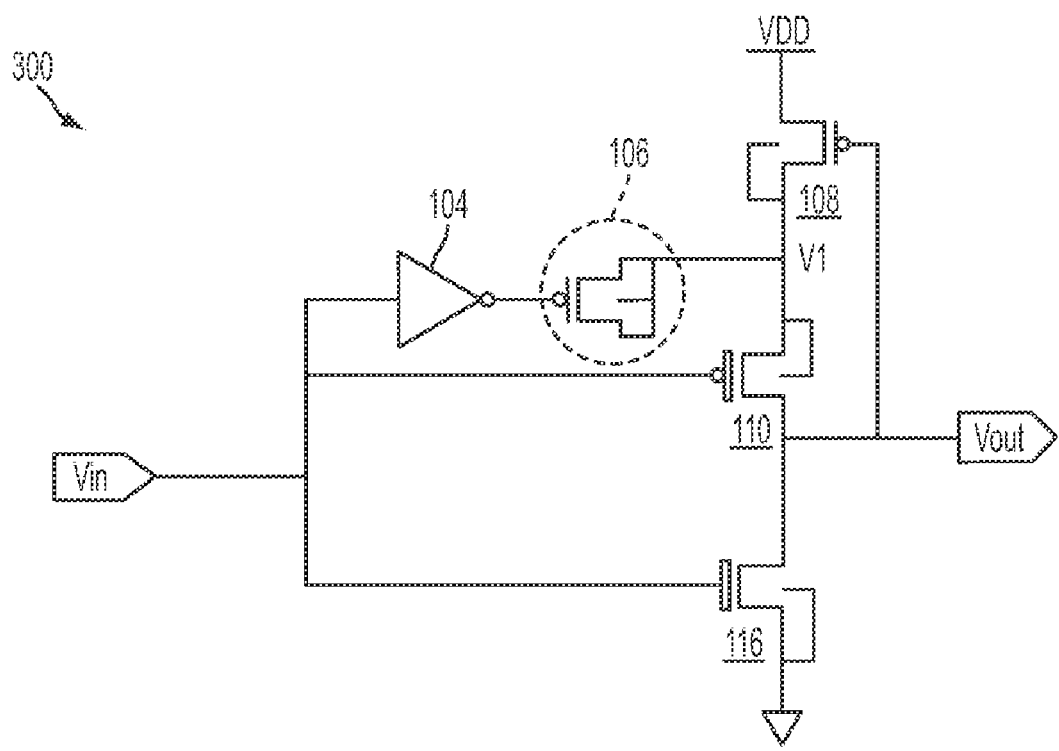
FIG. 3 is a schematic diagram showing an exemplary charge pump doubler circuit according to another embodiment.

FIG. 3 is a schematic diagram showing an exemplary charge pump doubler circuit according to another embodiment. The circuit 300 is similar to the circuit 100 except that it does not include the inverter 102, the MOS capacitor 112, the diode-connected PMOS transistor 114, and the NMOS transistor 118. Because the circuit 300 does not have the inverter 102, Vin and Vout have the opposite logic state, e.g., when Vin is a logical 1, Vout is a logical 0, and can be used for negative voltage (VBB) circuits. The operation of the circuit 300 is similar to the circuit 100 described above.

In at least one embodiment, an exemplary VBB charge pump circuit using three charge pump doubler circuits 300 in each of its four charge pump sets, the current driving capability was 2.43 mA, compared to only 1.74 mA of a conventional circuit (using typical speed devices (TT), at a temperature at −40 degrees C., VDD=0.85 V, assuming a PMOS transistor with a thicker gate oxide has a Vt that is 200 mV higher than a logic device.)

Figure 4:
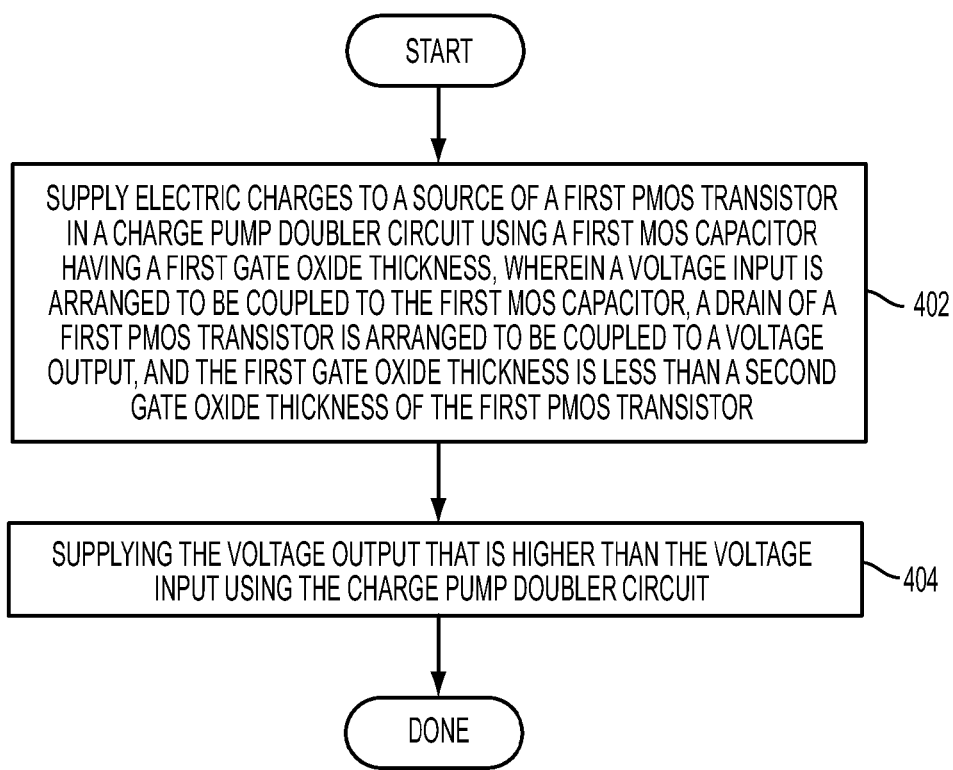
FIG. 4 is a flowchart showing an exemplary method of the charge pump doubler circuit shown in FIG. 1 and/or FIG. 3 according to one embodiment.

FIG. 4 is a flowchart showing an exemplary method of the charge pump doubler circuit shown in FIG. 1 and/or FIG. 3 according to one embodiment. At step 402, electric charges are supplied to a source of a first PMOS transistor, e.g., 110, in a charge pump doubler circuit, e.g., 100 or 300, using a first MOS capacitor, e.g., 106, having a first gate oxide thickness. A voltage input, e.g., Vin, is arranged to be coupled to the first MOS capacitor, e.g., 106, a drain of a first PMOS transistor, e.g., 110, is arranged to be coupled to a voltage output, e.g., Vout, and the first gate oxide thickness is less than a second gate oxide thickness of the first PMOS transistor, e.g., 110. At step 404, the voltage output is supplied that is higher than the voltage input by the charge pump doubler circuit, e.g., 100 or 300.

The method can further comprise coupling a source of a first NMOS transistor, e.g., 116, having a third gate oxide thickness to a drain of a second NMOS transistor, e.g., 118, having a fourth gate oxide thickness. A drain of the first NMOS transistor, e.g., 116, is arranged to be coupled to the voltage output, e.g., Vout, and the fourth gate oxide thickness is less than the third gate oxide thickness. The method can further comprise supplying a low power supply voltage, e.g., ground, to the second NMOS transistor, e.g., 118.

The method can further comprise supplying a high power supply voltage, e.g., VDD, to a second PMOS transistor, e.g., 108. A drain of the second PMOS transistor, e.g., 108, having a gate oxide thickness less than that of the first PMOS transistor, coupled to a source of the first PMOS transistor, e.g., 110. The method can further comprise turning off the second PMOS transistor, e.g., 108, as the voltage output, e.g., Vout, becomes equal to the high power supply voltage, e.g., VDD. The method can further comprise keeping the gate voltage of the first NMOS transistor, e.g., 116, higher than the gate voltage of the first PMOS transistor, e.g., 110, using a voltage keeper circuit, e.g., a circuit including 112 and 114.

An integrated circuit according to some embodiments includes a first PMOS transistor having a first gate oxide layer thickness. A first drain of the first PMOS transistor is arranged to be coupled to a voltage output. A second PMOS transistor has a second gate oxide layer thickness. A first source of the first PMOS transistor is coupled to a second drain of the second PMOS transistor. A second source of the second PMOS transistor is arranged to be coupled to a high power supply voltage. A first MOS capacitor has a third gate oxide layer thickness. A third source of the first MOS capacitor and a third drain of the first MOS capacitor are coupled to the first source of the first PMOS transistor. A first NMOS transistor has a fourth gate oxide layer thickness. A fourth drain of the first NMOS transistor is coupled to the first drain of the first PMOS transistor. The integrated circuit is configured to receive a voltage input to generate the voltage output that has a broader voltage range with a higher maximum voltage than the voltage input. The third gate oxide layer thickness of the first MOS capacitor is less than the first gate oxide layer thickness.

A method for a charge pump doubler circuit includes supplying electric charges to a source of a first PMOS transistor in the charge pump doubler circuit using a first MOS capacitor having a first gate oxide thickness. A voltage input is arranged to be coupled to the first MOS capacitor. A drain of a first PMOS transistor is arranged to be coupled to a voltage output. The first gate oxide thickness is less than a second gate oxide thickness of the first PMOS transistor. The method further includes supplying a voltage output that has a higher voltage range than the voltage input using the charge pump doubler circuit.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above method embodiment shows exemplary steps, but they are not necessarily required to be performed in the order shown. Steps may be added, replaced, changed order, and/or eliminated as appropriate, in accordance with the spirit and scope of embodiment of the disclosure.

Each claim of this document constitutes a separate embodiment, and embodiments that combine different claims and/or different embodiments are within scope of the disclosure and will be apparent to those skilled in the art after reviewing this disclosure. Accordingly, the scope of the disclosure should be determined with reference to the following claims, along with the full scope of equivalents to which such claims are entitled.

What is claimed is:

1. An integrated circuit, comprising:
a first PMOS transistor having a first gate oxide layer thickness, wherein a first drain of the first PMOS transistor is arranged to be coupled to a voltage output;
a second PMOS transistor having a second gate oxide layer thickness, wherein a first source of the first PMOS transistor is coupled to a second drain of the second PMOS transistor and a second source of the second PMOS transistor is arranged to be coupled to a high power supply voltage;

a first MOS capacitor having a third gate oxide layer thickness, wherein a third source of the first MOS capacitor and a third drain of the first MOS capacitor are coupled to the first source of the first PMOS transistor;

a first NMOS transistor coupled between the voltage output and a low power supply voltage, the first NMOS transistor having a fourth gate oxide layer thickness, wherein a fourth drain of the first NMOS transistor is coupled to the first drain of the first PMOS transistor, wherein the integrated circuit is configured to receive a voltage input to generate the voltage output that has a broader voltage range with a higher maximum voltage than the voltage input, and the third gate oxide layer thickness of the first MOS capacitor is less than the first gate oxide layer thickness, and the third gate oxide layer thickness of the first MOS capacitor is less than the fourth gate oxide layer thickness of the first NMOS transistor.

2. The integrated circuit of claim 1, wherein the second gate oxide layer thickness is less than the first gate oxide layer thickness.

3. The integrated circuit of claim 1, further comprising a second NMOS transistor, wherein a fourth source of the first NMOS transistor is coupled to a fifth drain of the second NMOS transistor.

4. The integrated circuit of claim 3, wherein a fifth gate oxide layer thickness of the second NMOS transistor is less than the fourth gate oxide layer thickness.

5. The integrated circuit of claim 3, wherein a fifth source of the second NMOS transistor is arranged to be coupled to the low power supply voltage.

6. The integrated circuit of claim 3, wherein a first gate of the first PMOS transistor is coupled to a second gate of the second NMOS transistor.

7. The integrated circuit of claim 1, further comprising a voltage keeper circuit configured to keep a first gate voltage of the first NMOS transistor higher than a second gate voltage of the first PMOS transistor.

8. The integrated circuit of claim 7, wherein the voltage keeper circuit comprises a second MOS capacitor and a diode-connected PMOS transistor.

9. The integrated circuit of claim 8, wherein a sixth gate oxide thickness of the second MOS capacitor is less than a seventh gate oxide thickness of the diode-connected PMOS transistor.

10. A method for a charge pump doubler circuit, comprising:

supplying electric charges to a source of a first PMOS transistor in the charge pump doubler circuit using a first MOS capacitor having a first gate oxide thickness, wherein a voltage input is arranged to be coupled to the first MOS capacitor, a drain of the first PMOS transistor is arranged to be coupled to a voltage output, a source of the first PMOS transistor is coupled to a high power supply voltage, and the first gate oxide thickness is less than a second gate oxide thickness of the first PMOS transistor;

biasing gates of the first PMOS transistor and a first NMOS transistor in response to an input signal at the voltage input, the first NMOS transistor coupled between the voltage output and a low power supply voltage, and the first gate oxide layer thickness of the first MOS capacitor is less than a third gate oxide layer thickness of the first NMOS transistor; and generating an output signal at the voltage output, the output signal having a voltage range greater than that of the input signal at the voltage input.

11. The method of claim 10, wherein the charge pump doubler circuit further comprises a second NMOS transistor, a source of the first NMOS transistor is coupled to a drain of the second NMOS transistor having a fourth gate oxide thickness, the fourth gate oxide thickness is less than the third gate oxide thickness, and the method further comprises selectively turning on or off the second NMOS transistor in response to the input signal.

12. The method of claim 11, further comprising supplying a signal to the first MOS capacitor and a complementary signal to a gate of the second NMOS transistor.

13. The method of claim 10, further comprising supplying the output signal to a gate of a second PMOS transistor having a fifth gate oxide thickness, a drain of the second PMOS transistor coupled to a source of the first PMOS transistor, wherein the fifth gate oxide thickness is less than the second gate oxide thickness of the first PMOS transistor.

14. The method of claim 13, further comprising turning off the second PMOS transistor as the voltage output becomes equal to the high power supply voltage.

15. The method of claim 10, further comprising keeping a first gate voltage of the first NMOS transistor higher than a second gate voltage of the first PMOS transistor using a voltage keeper circuit.

16. The method of claim 15, wherein the voltage keeper circuit comprises a second MOS capacitor and a diode-connected PMOS transistor, and a fifth gate oxide thickness of the second MOS capacitor is less than a sixth gate oxide thickness of the diode-connected PMOS transistor.

17. The method of claim 15, further comprising charging the first MOS capacitor.

18. An integrated circuit, comprising:

a first PMOS transistor having a first gate oxide layer thickness, wherein a first drain of the first PMOS transistor is arranged to be coupled to a voltage output;

a second PMOS transistor having a second gate oxide layer thickness, wherein a first source of the first PMOS transistor is coupled to a second drain of the second PMOS transistor and a second source of the second PMOS transistor is arranged to be coupled to a high power supply voltage;

a first MOS capacitor having a third gate oxide layer thickness, wherein a third source of the first MOS capacitor and a third drain of the first MOS capacitor are coupled to the first source of the first PMOS transistor;

a first NMOS transistor having a fourth gate oxide layer thickness, wherein a fourth drain of the first NMOS transistor is coupled to the first drain of the first PMOS transistor, a second NMOS transistor, wherein a fourth source of the first NMOS transistor is coupled to a fifth drain of the second NMOS transistor, and a fifth drain of the second NMOS transistor is coupled to a low power supply voltage, wherein the integrated circuit is configured to receive a voltage input to generate the voltage output that has a higher voltage range than the voltage input, the second gate oxide layer thickness and the third gate oxide layer thickness are less than the first gate oxide layer thickness, and the fifth gate oxide layer thickness of the second NMOS transistor is less than the fourth gate oxide layer thickness.

19. The integrated circuit of claim 18, further comprising a voltage keeper circuit configured to keep a first gate voltage of the first NMOS transistor higher than a second gate voltage of the first PMOS transistor, wherein the voltage keeper circuit comprises a second MOS capacitor and a diode-connected PMOS transistor, and a sixth gate oxide thickness of the second MOS capacitor is less than a seventh gate oxide thickness of the diode-connected PMOS transistor.

20. The integrated circuit of claim 18, wherein the third gate oxide layer thickness of the first MOS capacitor is less than the fourth gate oxide layer thickness of the first NMOS transistor.

* * * * *